(12) United States Patent
Vallier et al.

(10) Patent No.: US 9,495,682 B2
(45) Date of Patent: Nov. 15, 2016

(54) CONVERGED MARKETING ARCHITECTURE AND RELATED RESEARCH AND TARGETING METHODS UTILIZING SUCH ARCHITECTURES

(75) Inventors: William E. Vallier, Bridgewater, NJ (US); Joseph R. Schlesier, West Orange, NJ (US); Robert Lewis D'Avanzo, Jr., Skillmen, NJ (US); Matthew J. Wylie, Basking Ridge, NJ (US)

(73) Assignee: Accenture Global Services Limited, Dublin (IE)

( * ) Notice: Subject to any disclaimer, the term of this patent is extended or adjusted under 35 U.S.C. 154(b) by 1459 days.

(21) Appl. No.: 11/513,111

(22) Filed: Aug. 31, 2006

(65) Prior Publication Data
US 2008/0059297 A1 Mar. 6, 2008

(51) Int. Cl.
*G06Q 30/00* (2012.01)
*G06Q 30/02* (2012.01)

(52) U.S. Cl.
CPC .......... *G06Q 30/02* (2013.01); *G06Q 30/0226* (2013.01); *G06Q 30/0239* (2013.01); *G06Q 30/0251* (2013.01); *G06Q 30/0253* (2013.01); *G06Q 30/0267* (2013.01); *G06Q 30/0268* (2013.01); *G06Q 30/0276* (2013.01); *G06Q 30/0277* (2013.01)

(58) Field of Classification Search
USPC ................................ 705/14.51, 14.58, 14.64
See application file for complete search history.

(56) References Cited

U.S. PATENT DOCUMENTS

| | | | | |
|---|---|---|---|---|
| 5,572,653 A | * | 11/1996 | DeTemple et al. | 345/501 |
| 5,918,211 A | * | 6/1999 | Sloane | 705/16 |
| 6,160,570 A | * | 12/2000 | Sitnik | H04N 7/163 |
| | | | | 348/E7.061 |
| 6,571,216 B1 | * | 5/2003 | Garg et al. | 705/14.25 |
| 6,886,000 B1 | * | 4/2005 | Aggarwal et al. | 705/80 |
| 7,158,943 B2 | * | 1/2007 | van der Riet | 705/14.41 |
| 7,212,979 B1 | * | 5/2007 | Matz | G06Q 30/02 |
| | | | | 348/E7.071 |
| 7,443,295 B2 | * | 10/2008 | Brice | B62B 3/1424 |
| | | | | 235/385 |
| 7,856,368 B2 | * | 12/2010 | Avallone et al. | 705/5 |
| 2002/0091568 A1 | * | 7/2002 | Kraft et al. | 705/14 |
| 2002/0144262 A1 | * | 10/2002 | Plotnick | G11B 27/005 |
| | | | | 725/32 |
| 2003/0154128 A1 | * | 8/2003 | Liga | G06Q 30/0208 |
| | | | | 705/14.11 |

(Continued)

FOREIGN PATENT DOCUMENTS

| | | | | |
|---|---|---|---|---|
| EP | 1 170 708 A2 | 1/2002 | | |
| EP | 1197905 A2 | * 4/2002 | ............. | G06F 17/60 |

OTHER PUBLICATIONS

Summons to Attend Oral Proceedings in EP Application No. 07017013.9-2221 dated Apr. 6, 2010 (6 pages).

(Continued)

*Primary Examiner* — Matthew T Sittner
(74) *Attorney, Agent, or Firm* — Harrity & Harrity, LLP

(57) ABSTRACT

Disclosed herein are converged marketing architectures that may be utilized by retailers in conjunction with and/or independent of consumer loyalty programs in order to improve targeted marketing efforts. Such architectures enable participating retailers to constantly generate and compile consumer activity and preferences information from a plurality of in-store and out of store activities, including e-commerce web site activity, television viewing and recording activity, and retail location activity. In certain embodiments, retail location activity may be monitored by one or more of RFID tracking sub-systems, smart shopping cart sub-systems, and point-of-sale information sub-systems.

33 Claims, 4 Drawing Sheets

(56) References Cited

U.S. PATENT DOCUMENTS

2004/0254837 A1* 12/2004 Roshkoff ............ G06Q 20/105
 705/14.13
2005/0144066 A1   6/2005 Cope et al.

OTHER PUBLICATIONS

Walter Reade et al., "RFID Systems for Enhanced Shopping Experiences," dated Nov. 10, 2003 (14 pages).

* cited by examiner

CONVERGED MARKETING ARCHITECTURE AND RELATED RESEARCH AND TARGETING METHODS UTILIZING SUCH ARCHITECTURES

FIELD OF THE INVENTION

The present invention relates to systems and methods for collecting consumer data from a variety of sources and compiling that data to assist in targeting advertising efforts. More particularly, the present invention relates to converged marketing architectures that may be utilized by retailers in conjunction with and independent of consumer loyalty programs in order to improve customized marketing efforts.

BACKGROUND OF THE INVENTION

As the nature of technology changes, the habits of consumers and the mechanisms of most effectively marketing to those consumers evolve. Conventionally, the Baby Boomer generation is considered by the marketing community to be comprised of brand loyalists whose purchasing decisions could be affectively influenced by brand image-based advertising. Thus, one of the most effective ways to market to the Baby Boomer generation is still traditional repetitive TV and radio advertising campaigns. Consumers that are members of younger generations, however, are thought to differ from Baby Boomers in that they tend to be more technologically savvy and less brand loyal. In this regard, marketing techniques such as web popup ads and banner ads may be used in addition to traditional advertising mechanisms in order to reach members of this generation.

Further, while consumers from older generations may have relied upon the expertise of sales persons in retail locations when making product purchase decisions, consumers from younger generations increasingly rely upon information collected form various third party sources. For example, it is common for many consumers from Internet savvy households to research products online and compare reviews from various competing products before making purchasing decisions. Such researching not only allows the consumer to learn the functions and or features of various products, but also to monitor and identify competitive pricing for products of interest.

As Generation Y, generally classified as including those persons born after 1980, continues to mature, the members of this generation grow in buying power and become increasingly important to marketers. The members of this generation, however, present their own unique challenges to advertisers and marketers. Members of Generation Y are generally thought of as being highly dependent upon technology in all facets of daily life. Members of Generation Y comprise a large proportion of the users of instant text messaging and mobile web (cell phone browsing of the Internet) and, compared with older generations, tend to be early adopters of new technologies. For example, marketing research indicates that the prime demographic for subscribers to portable music downloading services (which enable cell phone subscribers to download digital music files to their phones and/or play them back on their phone at any time from any location) are the relatively younger members of generation Y. Young consumers therefore are being indoctrinated into a lifestyle of regularly making decisions on the go in light of information collected from a variety of resources.

Specifically with regard to the types of marketing efforts being utilized, broadcast messages (such as TV and radio advertisement spots and print advertisements) targeting the widest audience possible still dominate as the most used marketing mechanism. Public touch points (e.g., roadside billboards, pop-up ads, etc.) are also used, but to a lesser extent. Consumer reaction to these mass marketing techniques is difficult to track with any level of detail or certainty.

Each current advertising medium, as currently utilized alone or in combination, provides inadequate advertisement performance due to limitations inherent to the medium. In the case of traditional television advertisements, the exposure to potential consumers is fairly large, but this exposure lasts only for a short period of time. Most problematic is that the exposure to television advertisements typically occurs at a time when the consumer is least ready to purchase (i.e., at home watching TV). Thus, even if the consumer is enticed to purchase the product or service or shop at the store or web site advertised, he or she must still remember to follow up on the offer at a later, more convenient time on his or her own. Further, traditional television advertisements do not provide advertisers with a means for establishing a continuing relationship with consumers.

With respect to interactive TV (usually supported by digital satellite and digital cable providers), merchants and advertisers have considered the use of interactive banner-type advertisements for display on the television screen that would allow consumers to follow up (by immediately connecting to an online e-commerce or information site in a manner similar to click-through Internet banners) on interesting advertisements, promotions or offers. This type of interactive television advertisements has been unsuccessful, however, because they create a diversion from regular programming as well as from upcoming advertisers.

Merchants and advertisers have also failed to find a manner that will gain mass public acceptance in which to utilize the mobile Internet (the integration of Internet access into mobile communication devices, such as mobile phones) for advertisements and other consumer promotions. These systems do not work well because a consumer can become so inundated with unwanted ads that he becomes disenfranchised with the mobile Internet and therefore either turns off his phone or even cancels his service completely.

The Internet has sponsored a few new and relatively successful advertising mediums, including online banner advertisements. On-line or electronic commerce ("e-commerce") is claiming a progressively larger share of consumer purchases, and Internet advertising for both online retailers and traditional "brick and mortar" retailers has grown similarly. A useful feature particular to web page banner advertisements and other Internet (and interactive) advertisement methods is that web serving software allows for the simple tracking and recording of Internet traffic. Thus, on-line merchants and banner advertisers as well as major portals have recognized the benefit of recording e-buyer purchasing patterns and preferences in order to more effectively communicate with customers and target receptive buyers with working advertisements. Conversely, traditional paper based advertisement and incentive programs typically fail to provide valuable demographic information about consumers or only gather demographic information at the time of redemption by manual recording. Banner advertisements and other forms of on-line interactive advertising, however, still only reaches a small subset of potential consumers and is only capable of tracking the on-line activities of those consumers.

Thus, retail stores are finding it more and more difficult to reach and influence consumers, and younger generation consumers in particular, with traditional promotional mechanisms. A recent innovation by large retail chains directed at building brand loyalty in consumers includes the innovation of consumer loyalty club programs. Such loyalty programs entice consumers to join by offering rewards, such as coupons, cash back rewards, or eligibility for special promotional offers, that are offered only to consumers that participate in the loyalty program. A consumer joins such a program by typically providing the retailer (either at a retail location during checkout, or during check out at the retailer's E-commerce website) sign-up information including their identity, interests, address, email address, and the like, and possibly by paying a nominal fee. To qualify for their loyalty rewards, the participating consumer must present their loyalty club card or provide some sort of other identification each time they make a purchase from the retailer. After a certain number of purchases or a certain dollar amount of cumulative purchases is met by participating consumer, they will qualify to redeem certain rewards.

Retailers benefit from consumer loyalty programs in two manners. First, participating consumers are given an incentive to always make purchases from the same retailer or retail chain as opposed to competitors. Secondly, retailers are able to collect fairly targeted information regarding participating consumers' purchasing histories. For example, a retailer may notice that a certain consumer participating in their consumer loyalty program frequently buys CDs for a particular style of music. Since the retailer has this information as well as the participating consumer's home and email addresses, the retailer may be able to send targeted advertisements to the user (such as by promotional inserts included with mailings of consumer rewards certificates). In this manner, the above-described user could be provided with lists of newly released CDs of the particular music type that the user likes, or coupons providing percentage discounts on volume CD purchases. Additionally, such information may also be used to entice consumers regarding products and other related areas. The participating consumer that has a history of purchasing CDs on a regular basis may also be sent advertisements regarding other music and audio entertainment items, such as portable digital audio players, home theatre speakers, and the like.

Nevertheless, current customer loyalty programs utilized by retailers fail to fully capitalize upon the potential such programs provide for targeted advertising. Targeted advertising would be most useful in situations where the consumer is ready for an immediate purchase. In such circumstances, it would be helpful if retailers or marketers would be able to determine exactly what kind of purchase a given consumer is thinking of making and be able to provide information to that consumer at or near the time when the consumer is most likely to make a purchase in order to maximize the ability to influence the purchaser's decision. While traditional print and electronic mailings generated in conjunction with current loyalty programs may be targeted to consumers based upon demographic and purchase history information of loyalty program participants compiled over time, such mailings nonetheless reach the consumer (if at all) when the consumer is not necessarily interested in or thinking about making a purchase. If and when the consumer eventually decides to make a purchase, the targeted mailing could be long forgotten or even lost.

As described above, there are many inefficiencies with respect to how retailers, producers, manufacturers, and advertisers gain consumer insight and how they tailor and review their marketing efforts. In trying to gain insight to consumer needs and desires, these entities are hampered by having only a few data sources that provide limited and often conflicting data. Conventionally, consumer preferences could only be derived indirectly through demographics or directly through limited-reach questionnaires. In this "pre-connected" world, there are few incentives for consumers to participate in marketing or helping those entities learn about their consumer base.

Thus, there remains a need in the art for improved systems and methods for achieving targeted advertising. It would be advantageous if such methods and systems were capable of identifying consumers when consumers are ready to make a purchase and providing those consumers with demographically targeted and or specific consumer targeted advertising at the point of sale. In particular, it would be helpful if such systems and methods were capable of providing targeted advertisements to consumers whether they are shopping at traditional brick and mortar retail store locations or shopping on a retailers website.

SUMMARY OF THE INVENTION

In light of the above needs, it is an object of the present invention to provide methods and systems for facilitating information accumulation from a large cross-section of consumers across various manners of interaction in order to support targeting of marketing efforts.

Additionally, it is an object of the present invention to provide a converged marketing architecture that accumulates information from consumers and communicates promotional material to consumers via the various electronic mechanisms that the consumers deal with in day-to-day life.

Furthermore, as an object of the present invention to provide a converged marketing architecture that encourages consumers to participate by coordinating and facilitating the flow of product description information to the consumers upon their demand and allowing them to opt in via consumer loyalty programs to receive targeted promotional items from retail entities via traditional direct mailing mechanism and point-of-sale mechanisms supported by various mechanisms of digital communications.

Also, it is an object of the present invention to provide methods and systems that facilitate the accumulation and analysis of market information from a variety of consumers at a variety of touch points in order to assist retailers and producers/manufacturers of products in identifying needs and desires of the consumer base.

Further, it is an object of the present invention to provide a system and method that generates valuable consumer demographic data for merchants or advertisers in an improved manner relative current electronic advertisements and traditional advertising media.

Additionally, it is an object of the present invention to utilize mobile telephone and web communication mechanisms in a manner that enables retailers and advertisers to target promotions and advertisements to consumers when they are ready to make purchases at traditional brick and mortar stores.

To achieve these and other objects, the present invention comprises a converged marketing architecture that includes a converged marketing central network adapted to collect information from a variety of consumers into a centralized consumer information database. In embodiments of the present invention, information may be collected from all consumers of a given retailer and/or from those consumers participating in a consumer loyalty program for the retailer ("participating consumers"). The converged marketing central network connects with one or more retail location satellite networks of at least one retailer being supported by the converged marketing architecture. This retailer, for example, may be a large scale "big box" retailer such as national consumer electronics or discount warehouse retailers. The converged marketing central network is adapted to collect information from the retail location satellite networks regarding consumer activities in conjunction with particular store locations of that retailer, from the retailer's e-commerce web portal(s), and from other sources not directly associated by the consumer with the retailer.

In certain embodiments of the present invention, consumers may be signed up by a participating retailer to become members of a consumer loyalty program for the retailer. As a condition of membership in the consumer loyalty program, these "participating consumers" would agree to receive marketing materials directly from the retailer and to, preferably, permit the consumer loyalty program to monitor television viewing habits and internet browsing habits to collect more detailed consumer purchasing history and habits information and demographics data for use by the retailer. The retailer can then use this information to tailor targeted advertisements to participating consumers and also craft and hone other types of advertisements and promotions directed to the whole consumer populace.

In preferred embodiments of the present invention, members of the consumer loyalty programs for a given participating retailer are given consumer loyalty cards that include radio frequency identification ("RFID") microchips that may be monitored by the various retail location satellite networks. Whenever a participating consumer visits a store location of the retailer (whether or not the participating consumer makes a purchase) the participating consumer will typically carry his or her loyalty card on his or her person so as to qualify for "points" toward loyalty rewards. The retail location satellite networks in such preferred embodiments include RFID-tracking means that monitor the activity of the participating consumers within the retail location. The satellite networks could thus catalogue the aisles visited, the items browsed, and the time in store, in addition to items purchased by a participating consumer (if applicable) whenever that consumer visits any monitored retail location. This in-store consumer activity may then be communicated back to the converged marketing central network for storage in the consumer information database.

Additionally, other preferred embodiments of the present invention may include consumer usable point-of-sale information systems and/or smart shopping cart systems for collecting information regarding the movements and activities of consumers within monitored retail locations. The consumer point-of-sale information systems can comprise electronic kiosks usable by consumers or retail sales force personnel to browse information concerning different products available for purchase within the retail location and to compare those products. When the point-of-sale information systems are used by participating consumers, each point-of-sale information system can electronically identify participating consumers (e.g., by some combination of asking the consumer to log in using an email address and password or other identifying information or by electronically reading the participating consumers customer loyalty card) and track the electronic browsing activity by the participating consumer. Such tracked browsing activity at the point-of-sale information systems can be used to supplement records in the consumer information database. Likewise, smart shopping carts utilized in embodiments of the present invention will incorporate electronic communication and RFID reading technology to track what kinds of products are typically purchased together or, most preferably, in the smart shopping cart of a given participating consumer. Understandably, such information when communicated to the consumer information database may be later used to identify potential cross promotion opportunities for the retailer, or used in real time to generate instant targeted promotions as described below.

In embodiments of the invention as described above, it is possible for information also to be collected from consumers that are not participating as members of the retailer's consumer loyalty program. Thus, the point-of-sale information systems may track usage information for any session of their use, even if a consumer does not log in. Such information, even if not associated with an individually-identifiable consumer, may nonetheless be used to collect useful information concerning the general consumer population of the retailer. Likewise, the smart shopping carts may also collect information concerning all consumers without specifically identifying a particular consumer.

In preferred embodiments of the present invention, the converged marketing architecture further enables a participating retailer to collect consumer information from a variety of sources other than consumer in-store activities within their various retail locations. The architecture converges that information from other sources with information collected from retailer-related activities (e.g., in-store and e-commerce activities) in order to collect large volumes of usable consumer information and demographics to both support targeted and mass market marketing efforts. The retailer's e-commerce web portal system can collect consumer activity information from browsing and purchasing activity on its e-commerce website. In like fashion to retail location activity, the website of the retailer can be adapted to monitor the browsing, researching, and purchasing activities of both participating consumers and non-participating consumers and then transmit the collected information regarding these activities to the converged marketing central network for storage in the consumer information database. Such information then can be used in real time to generate instant targeted promotions to on-line customers shopping at e-commerce websites of the retailer.

Additionally, information can be collected from consumers regarding activities not specifically associated with a participating retailer. For example, a public web portal can be provided in conjunction with the customer loyalty program whereby consumers may research various products and manage individual customer loyalty program accounts. Such accounts may be used to set preferences for participating consumers being contacted, establish gift lists or wish lists, redeem loyalty rewards, and other like activities.

Participating consumers of the loyalty programs may also be given the opportunity in preferred embodiments to opt to allow their television watching activities to be monitored as a part of their membership in the consumer loyalty program. For example, participating consumers may be given discounts in the service fees associated with personal video recording ("PVR") services in association with their cable or satellite television service. The usage information collected by the PVR service, which typically includes information regarding what programs a given household elects to view or record (or commercials they skip over versus watch), may then also be communicated to the converged marketing central network and merged with consumer information collected from the other sources.

In the various embodiments of the present invention, the information collected in the consumer information database may be utilized to tailor and drive product sales promotions at or near a time of potential purchasing activity, such as while a given consumer is shopping in a store location of a participating retailer. One preferred mechanism for delivering targeted advertising at the point of sale, includes the use of cellular telephone instant messages, such as text messages, being delivered to a participating consumer after the consumer enters the store. In such preferred embodiments of the present invention, a participating consumer can be identified when they enter a retail location by their RFID tagged consumer loyalty card. And the retail location satellite network could then initiate a request for the converged marketing central network to generate a targeted advertisement to the consumer via a text messaging protocol to the particular participating consumer's cellular phone. The converged marketing central network would then review the demographic information and collected purchasing history information concerning the participating consumer and then in conjunction with the pre-established promotional desires of the participating retailer craft a targeted and time specific promotional message to that participating consumer.

The convergence of electronically collected information enabled by embodiments of the present invention permits consumers participate or opt-in in order to be marketed to, which in turn enables multi-sourced data sets to be collected and collated to provide accurate marketing strategies to those consumers and also permits compiling of data sets for making more generalized demographic conclusions. The consumer benefits from the special offers being driven to them while the commercial entities benefit from increased awareness of consumer preferences through the passive data collection methods. Additionally, targeted marketing messages delivered by consumer preferred modes increase both the number and quality of touch points. Additionally, feedback is provided to the commercial entities on a continuous and near-immediate basis to facilitate rapid post-event analysis through analytic "dashboards" or other such reports.

It should be readily appreciated by one skilled in the art that embodiments of the present invention can be utilized in conjunction with a single participating retailer and its associated consumer loyalty program or can be used to established generic consumer loyalty programs that may span and/or merge consumer loyalty programs from multiple participating retailers. In such embodiments of the invention where there are multiple participating retailers, the converged marketing architecture of the present invention would integrate multiple retailer central networks, each controlling one or more associated retail location satellite networks, with a converged marketing central network in order to create targeted advertising opportunities for the multiple participating retailers while also allowing those participating retailers to cooperate with one another to take advantage of cross-promotional opportunities and the like.

In this regard, a first aspect of the present invention includes an electronic system for collecting and compiling consumer data from a variety of sources for assisting in advertising efforts. The system includes a central network having a database system for storing consumer activity information obtained from a plurality of sources. The central network also has a computing means that provides an application for interfacing with the variety of sources and the database system. One or more retail location systems, each associated with a different physical retail location of a retailer, are in electronic communication with the central network. Each of these retail location system have at least one information sub-system adapted to collect consumer activity information relating to in-store activities of consumers occurring in its associated physical retail location. The system further includes means for electronically collecting consumer activity information relating to out-of-store activities of consumers. This means for electronically collecting is also in electronic communication with the central network. The retail location systems and the means for electronically collecting provide information concerning individually identifiable consumers and generic consumers to the central network. The individually identifiable consumers are those that have elected to participate in a customer loyalty program associated with the retailer. The application in the central network is adapted to merge in-store information and out-of-store information relating to individually identifiable consumers to enable crafting of targeted advertisements to select ones of the individually identifiable consumers.

Further, a second aspect of the present invention relates to a converged marketing process for providing targeted promotional messages to consumers at a time of high probability of influencing a sale decision. The process includes establishing a converged marketing architecture where the architecture comprises a central network, one or more retail location systems each associated with a different physical retail location of a retailer and adapted to collect information relating to in-store activities of consumers, and means for electronically collecting consumer activity information relating to out-of-store activities of the consumers. Advertising and configuration rules are defined in a central rules and configuration database of the central network. Next, a portion of the consumers are enrolled into a customer loyalty program associated with the retailer. Consumer activity information is then collected from the retail location systems and the means for collecting, and this information is then stored in a consumer activity database. The central network is adapted to merge portions of the in-store information and the out-of-store information that are identified as relating to consumers enrolled in the customer loyalty program. The process further includes receiving an indication to initiate a promotion, and initiating a targeted promotion in response to a received indication in accord with the advertising and configuration rules and the consumer activity information.

Additionally, a third aspect of the invention includes a computing network architecture adapted to collect and compile consumer data from a variety of sources and assist marketers in researching and delivering advertising efforts. The network architecture includes a central network having a database system for storing consumer activity information and advertising and configuration rules. The network architecture also has a plurality of retail location satellite networks each associated with a different physical retail location of a retailer. Each satellite network is in electronic communication with the central network and receives consumer activity information from a plurality of information sub-systems adapted to collect consumer activity information relating to in-store activities of consumers occurring in their associated physical retail location. Additionally, the network architecture includes means for electronically collecting consumer activity information relating to out-of-store activities of consumers, which means for electronically collecting is in electronic communication with the central network. The network architecture is characterized in that the database system identifies certain consumers that have opted to participate in a customer loyalty program associated with the retailer. The satellite networks and the means for electronically collecting provide consumer activity information concerning these certain consumers and concerning generic consumers, and the central network merges in-store information and out-of-store information relating to each of these certain consumers to create a personalized history of purchasing and browsing activity based upon in-store and out-of-store activity information.

The various embodiments of the invention having thus been generally described, several illustrative embodiments will hereafter be discussed with particular reference to several attached drawings.

DETAILED DESCRIPTION OF THE PREFERRED EMBODIMENTS

Figure 1:
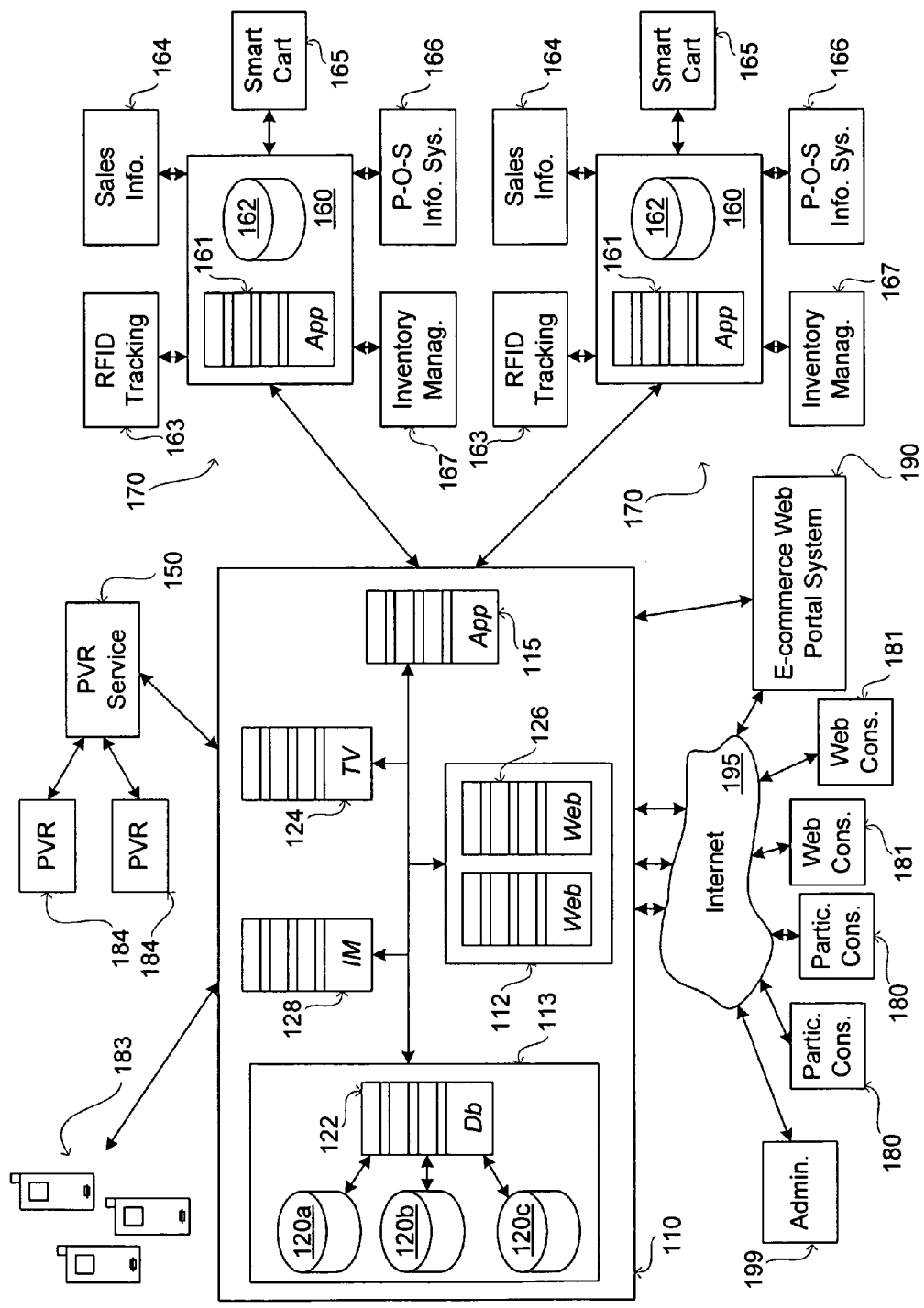
FIG. 1 is a schematic diagram showing a converged marketing architecture according to an embodiment of the present invention.

The converged marketing architectures of the present invention are associated with at least one retailer referred to herein as a "participating retailer." As depicted in FIG. 1, for each retail store location that the participating retailer desires to integrate into a converged marketing architecture 100 there is established a retail location system 170. Each such retail location system 170 includes a retail location satellite network 160. Preferably, the participating retailer establishes a retail location system 170 for as many of its brick and mortar retail store locations as is possible to enable the information gathering techniques described herein to have the widest potential consumer base, and thus widest potential information base. The converged marketing central network 110 contains various networking sub-systems to integrate the various retail location systems 170 and other elements of the architecture 100, and includes servers, storage units, and various other electronics to establish a networking environment as are commonly used in the industry to produce commercially suitable networking and/or web-serving platforms. For example, suitable arrangements include any number of commercially available server machines, such as a SunServer, Compaq Proliant, or Dell Dimension, running a viable operating system, such as UNIX, Linux, or Windows NT, interconnected by routers, firewalls, and the like into a local area network ("LAN").

In the preferred embodiment as shown, converged marketing central network 110 includes various servers 115, 122, 124, 126, and 128 that enable the network 110 to communicate with other elements of the converged marketing architecture 100 and perform the functions as herein described. Converged marketing application server 115 of converged marketing central network 110 serves as the primary mechanism for interfacing with and integrating various aspects of the converged marketing architecture 100. As depicted in FIG. 1, application server 115 is in electronic communication with the retail location satellite network 160 of each retail location system 170. In particular, it communicates with each retail location satellite networks' local converged marketing application sever 161 that runs the various applications and routines necessary to monitor various associated sub-systems 163-167 that feed marketing information collected by the retail location into the architecture 100. Converged marketing application server 115, however, is also connected within the converged marketing central network 110 with a television information collection server 124, a database sub-system 113, a web server sub-system 112, and an instant messaging server 128. Web server sub-system 112 contains various web servers 126 to support interaction over various Internet protocols, such as, for example, a public web portal accessible over the Internet 195 by participating consumer users 180 in order to set up rules, such as stored in a rules database (e.g., database 120c as described below) dictating various aspects of their participation in consumer loyalty programs for the participating retailer as described in further detail below.

With regard to database sub-system 113, it contains one or more database servers (e.g., server 122) and one or more databases (e.g., databases 120a-120c) storing information in appropriate storage media. The storage media utilized in embodiments of the present invention are electronically connected to the database servers, and each database may store its data in any manner known in the art, such as directly on a server hard drive, or remotely on external storage media including tape drives, CD-RWs and writable optical disks, and remote hard drives.

With regard to database server 122, since standard SQL databases conventionally are not directly accessible via the Internet 195, a variety of HTML front-ending tools, such as ASP scripts, java scripts, VBScripts, or CGI scripts, may be incorporated within the serving software running on the server machines of database sub-system 113. Accordingly, these front-ending tools operate as extensions to the server software running on web servers 126 of serving sub-system 112. These tools, for example, allow administrators 199 of converged marketing network 110 to access consumer purchase and browsing history information from the database system 113 from remote computers using web browser applications connected to the network 110 over the Internet 195 via a front end application. Thus, it should be appreciated that the server software utilized in server system 112 interacts with such HTML front-ending tools to communicate with an appropriate database in the database sub-system 113 via SQL or other suitable data access languages to obtain the latest data whenever requested by an advertising administrator, network administrator, participating consumer, or the like.

Preferably, the database sub-system 113 contains at least one rules and configuration database 120c designed to hold user account and preferences information for participating consumers, and retailer/advertiser incentive and promotion rules that establish how and when network 110 should generate instant promotions or other general/targeted advertisements (such as sent to a participating consumer's cell phone 183, as will be described in more detail below).

In preferred embodiments of the database sub-system 113 as depicted, the rules and configuration database 120c would contain administrative information specific to the account of each participating consumer (e.g., a consumer that has opted to participate in the converged marketing architecture such as by joining a customer loyalty program of a participating retailer). Such information could include information relating to the identity of the participating consumer, his or her email and postal addresses, cellular telephone number for mobile instant messages, loyalty card ID (and optionally RFID), login names and passwords for obtaining access to each account. The administrative information for each participating consumer would be linked to purchasing and browsing history information stored elsewhere in the database system 113.

Database sub-system 113 further includes at least one consumer information database for storing consumer demographic and advertising insight information, which advertising insight information may include product browsing history, advertising response history, and purchase history. In the embodiment of network 110 depicted in FIG. 1, database sub-system 113 includes two such databases. The first is a participating consumer database 120a for storing demographic and advertising insight information for participating customers (i.e., those customers participating in one or more consumer loyalty programs of the participating retailer(s)) collected from a variety of sources. Additionally, a generic consumer database 120b is present for storing information regarding generic consumer activity, such as generic sales and browsing data generated by the retail location systems 170 and the retailer's e-commerce web portal system 190.

As shown in FIG. 1, each retail location satellite network 160 may have a local converged marketing database 162 connected to its converged marketing application server 161. This local converged marketing database 162 on the retail location satellite network level functions to collect information from the retailer's various retail location information sub-systems 163-167. This information is then sent (on a periodic, real time or other suitable basis) to the converged marketing central network 110 for storage in the centralized consumer information databases, such as databases 120a and 120b. In this manner, all consumer information gathered from activities associated with the various retail store locations can be centralized to be then analyzed and utilized for various targeted advertising and promotional efforts. Additionally, retailer and advertiser incentive and promotion rules may be stored in, and occasionally pushed downward from, rules and configuration database 120c to local converged marketing database 162 for use in various point-of-sale promotional mechanisms, as described further below.

In preferred embodiments of the present invention, as depicted in FIG. 1 the converged marketing architecture 100 further enables a participating retailer to collect consumer information from a variety of sources other than in-store activities of consumers within their various retail locations. The architecture 100 converges this information from in-store activities in order to collect large volumes of usable consumer information and demographics to both support targeted and mass market marketing efforts.

One such source utilized in certain embodiments of the present invention is the at-home television viewing habits of participating consumers. For example, as depicted in FIG. 1, television viewing and recording habits of participating consumers using PVR devices 184 when watching television at home can be tracked by a PVR service 150. In such circumstances, participating consumers may be given the option of accepting discounted service fees for personal video recording ("PVR") services (such as offered by, for example, a satellite or cable provider or other unaffiliated service provider) in exchange for agreeing to let the PCR service 150 share certain PCR usage information with the architecture 100. It is common for PVR service providers to track information regarding what programs a given PVR device 184 is instructed to tune into or record, and which portions of the programming, including commercials, the viewer elects to skip over versus watch. PVR server 150 according to such embodiments of the invention communicates this PVR usage tracking information to television information collection server 124 of the converged marketing central network 110, which works with the application server 115 and the database system 113 to merge it with consumer information collected from other sources for the participating consumer. Thereafter, it can be reviewed for later use in crafting promotional strategies.

Similarly, although not depicted in FIG. 1, television viewing habits tracked by pay-per-view or video on-demand services offered by satellite or cable television service providers could be tracked in like fashion.

A second such source in addition to the retail store locations of the participating retailer includes the consumers' e-commerce activity, such as would occur at the participating retailer's e-commerce web site supported by its e-commerce web portal system 190 as also depicted in FIG. 1. The retailer's e-commerce web portal system 190 can collect consumer activity information from browsing and purchasing activity of logged in participating consumers and of generic e-commerce consumers on its e-commerce website. The website of the participating retailer can be adapted to monitor the browsing, product researching, and purchasing activities of both participating consumers 180 and non-participating generic web consumers 181 and then transmit the collected information regarding these activities to the converged marketing central network 110 for storage in the consumer information database system 113. This information then is likewise stored and merged with information collected from other sources for later used by the architecture 100 as described herein.

Such embodiments of the invention thus take advantage of the fact that each participating retailer may utilize a conventional e-commerce web portal system 190 to support Internet sales as is known. In this regard, the e-commerce web portal system 190 preferably is integrated with the converged marketing central network 110 via converged marketing application server 115. As with the point-of-sale information systems 166, information from the e-commerce web portal system ultimately is used by the application server 115 to populate and update the consumer information databases 120a and 120b. E-commerce web portal 190 is of conventional design, having means for allowing remote users (including participating consumers 180 and non-participating consumers 181) to review information concerning products offered for sale by the participating retailer, preferably irrespective of whether they be offered for sale over the Internet and/or through the participating retailer's brick and mortar stores. Typically, the retailer would maintain a central product information database that contains product information records that contain various types of descriptive information concerning all of the products that it sells and such PVR devices 184 would be utilized by the system 190 to provide informative product description and specification web pages to e-commerce consumers. The web portal 190 also provides means for facilitating a purchase of desired products identified by the remote users. This can include web pages and forms enabling users to identify a local retail location having a desired product in stock, to reserve the desired product at such a local retail location for in person purchase and pickup, or to arrange and complete a mail order transaction electronically. In accordance with the purpose of architecture 100, web portal 190 is adapted to collect and transmit use information back to the converged marketing application server 115 which then stores that information in consumer information databases 120a and 120b of the converged marketing central network 110. In this manner, e-commerce web portals 190 of participating retailers may be used to collect and aggregate consumer activity information concerning all products either bought or browsed on their web portal and, if a participating consumer logs in to the e-commerce web site, to associate such consumer activity information with a specific consumer.

The various retail location systems 170 according to preferred embodiments of the present invention include a local computer network that may be integrated with various information sub-systems, including a point-of-sale information sub-system 166, which may include one or more interactive kiosks that are located a various positions within a given retail location. The point-of-sale kiosks have means for allowing users at the corresponding retail location to review information concerning products being sold by the retailer and thus learn about those products and potentially identify products that meet their desires to assist in purchasing decisions. Further, the point-of-sale information sub-systems 166 are adapted to transmit use information back to the converged marketing network 110 (via the retail location satellite networks 160) such that the converged marketing architecture 100 may be used to collect and aggregate consumer preference information therefrom to assist in targeting advertising.

Likewise, system 170 could include one or both of a smart shopping cart sub-system 165 and a RFID tracking sub-system 163 adapted to monitor consumer browsing activity within the physical store of the participating retailer. Such an RFID tracking sub-system 163 is adapted to interact with RFID-tagged customer loyalty cards carried by participating consumers when they visit retail store locations. The RFID tracking sub-system comprises a group of RFID reader sensors located at various positions with a store networked with a computing device for tracking RFID readings of those sensors. Sub-system 163 enables a participating consumer carrying an RFID-tagged customer loyalty card to be detected and identified when inside a retail store location and, most preferably, enables the participating consumer's locations (departments, aisles, etc.) visited within the store to be tracked. Such identifying and tracking enables immediate triggering of possible targeted marketing efforts to that participating consumer using, for example, instant messaging to a cellular telephone 183 of the participating consumer.

Also as depicted in FIG. 1, retail location systems 170 preferably include a smart shopping cart sub-system 165 that utilizes smart shopping carts that identify RFID-tagged product packages as they are placed in the cart by consumers shopping within the retail store location. A smart shopping cart in such embodiments would include RFID sensing means for sensing when RFID-tagged boxes and other product items are placed within the basket of the cart and communication means for wirelessly communicating with the a central computing device associated with the retail location network 160. Preferably, each smart shopping cart is fitted with an integrated mobile communication device that is wirelessly connected to the network 160 via the communication means and contains a display screen for communicating offers and other information (e.g., price of items in cart). Thus, when RFID-tagged products are placed within the cart, the architecture 100 can continuously monitor the potential near-term purchases of that customer. Understandably, such information enables the architecture 100 to target that customer using messages on the display screen of the respective smart shopping cart with instant in-store promotional offers from the converged marketing central network 110.

Also preferably, the system 170 includes integration with a sales information sub-system 164 and an inventory management sub-system 167 that are adapted to collect sales and inventory related data for the retail location. This information could be accessed by the retail location system 170 for transmission to and storage and use by the converged marketing central network 110. The information from these various retail location information sub-systems 163-167 thus may be compiled, aggregated, and analyzed to assist in marketing and promotional efforts as will be described in further detail below.

Understandably, this consumer preference information stored in the centralized consumer information databases may be used to generate consumer trend and market demographic data and reports (such as a via a front end web interface for retailers, advertisers, or other types of administrators 199 accessible over the Internet 195) that are valuable to all of the retailers and the various producers/manufacturer that sell their products through the retailer(s). Thus, information collected in the consumer information databases 120*a* and 120*b* may be used to assist retailer, producers, and manufacturers in making strategic decisions as well as enabling them to execute targeted consumer-by-consumer advertising in accord with their strategic decisions. The operation and functionality of preferred kiosk designs will be discussed in further detail below.

One of ordinary skill in the art will understand that the e-commerce web portal 190 functioning can be similarly adapted to generate usage data in a variety of manners. This data could then be combined with the point-of-sale information system usage data in the production of such usage reports. Screen selections (touches or clicks), advertisement click-through operations, products added to wish lists, products researched (such as by "comparing" to like products, reading a review of the product, or the consumer accessing a "detailed specifications" page for the product), and the like can be anonymously tracked and transmitted for storage by the product information system in a market information database. This data can be later analyzed, such as in conjunction with actual sales data from retailer locations and the e-commerce website, to provide the subscribing retailers with information concerning the emerging interests of its consumer base. Reports can thereby be generated on both specific (i.e., specific retailer) and more general (e.g., geographic area) levels. Furthermore, for participating consumers, more information can be obtained allowing more efficient direct marketing to be possible.

The specifics of a retail location system 170 will now be described in further detail. As described generally above, it is conventional for retailers to utilize an electronic database of product information records that contain descriptive information regarding the retailer's various products, which records are accessible via the retailer's e-commerce web site by consumers. This is done to drive consumer awareness of, and thus hopefully sales of, products offered for sale by the retailer. According to certain embodiments of the present invention, consumer interaction with such product information records can be tracked by the e-commerce system to produce advertising insight information and data that may be compiled into consumer activity information records. Additionally, as described further below, the use of such information by consumers within retail store locations of the participating retailer can similarly be tracked with point-of sale information sub-system kiosks. Such product information records are not only uploaded to the e-commerce website of the participating retailer, but also distributed by the participating retailer to their various point-of-sale information systems so that they are accessible by consumer and/or sales person users at retail locations. Each point-ofsale information system thus preferably is able to access a product information database for the retailer such that it provides a means for accessing product information concerning various products being sold at the particular retail location where the point-of-sale system is located. The point-of-sale information systems are adapted to allow users such as retail employees or consumers, to review the product information and thus learn about products sold at the corresponding retail location and in turn assist consumers in identifying products that may be of interest. Additionally, the point-of-sale information system kiosks may be used to drive sale information to a particular participating consumer or to generic consumers generally using integrated RFID loyalty cards as described in further detail below. The retailers' product information database understandably is typically updated as new products are added to the inventory of a particular retailer location (or organization wide for a particular retailer). Usage tracking information, however, may be collected from the web portal system 190 or point-of-sale information sub-system 166 as various users review these product information records in real time or near real time. Such advertising insight information gleaned from interactions with the product information records (whether online or via point-of-sale kiosks) is transferred upstream to consumer information databases of the converged marketing architecture 100 making it available for a compiling aggregated market information for use by producers or retailers to make marketing decisions concerning their products and related promotions while also compiling specific consumer-by-consumer data for participating consumers.

As shown in FIG. 1, each retail location satellite network 160 is connected to the converged marketing central network 110, such as with a high speed Internet connection. A high speed connection is preferable as it allows real time access to user account information contained in the various databases of the converged marketing network 110 and such will enable centralization of wish lists, preferences, and other information concerning participating consumers. This information can then be used by any of the point-of-sale information systems pushed down to the retail location system 170 level such that it may be accessed by participating consumers.

As indicated generally above, the point-of-sale information sub-systems 166 are typically in the form of a network of one or more interactive electronic kiosks located at various locations within the retail stores of various participating retailer. These kiosks can generate immediate product in-store sales (e.g., impulse sales) for promotional products, or products of particular interest to a participating consumer. The point-of-sale kiosks provide access to the product information records, but supplements the information requested by the user with marketing promotional messages crafted in response to or triggered by participating consumer information contained in the databases of the converged marketing central network 110 (which are in turn pushed down to the retail location systems 170) and/or activity of the consumer (participating or generic) as the interact with a given kiosk.

A suitable point-of-sale kiosk according to embodiments of the present invention would be capable of displaying multimedia information, and typically would include a computing device that powers a video display device and speakers. The kiosk would typically include some mechanism for accepting input from a user, such as touch screen displays, keyboards, pointing devices, and the like. Preferably, as described below, the kiosk also includes bar code scanners and/or readers (and optionally printers) to enable additional functionality. The computing device of each kiosk would typically be networked (such as wirelessly or wired) to the retail location satellite network 160 and thus also to the converged marketing central network 110. In this regard, application server 115 of the converged marketing central network 110 would be connected over the Internet (or other electronic communications means) to the local converged marketing application server 161 to permit the retail location system 170 to download updated data regarding consumer information, promotional content, promotion instructions, and rules from the database system 113 as necessary (such as nightly, weekly, in real time, or otherwise as needed).

Additionally, each retail location satellite network 160 may optionally be integrated with the retailers' local inventory management sub-system 167 in order to provide information via the kiosks concerning the stocking status of the particular goods of interests. Preferably, each kiosk also includes a bar code scanning device that enables a consumer in a retail store location to automatically locate and review product information corresponding to a specific product. In this manner, a consumer can walk up to a given kiosk with an item in hand and use that item to automatically pull up available information concerning that item simply by scanning the bar code on its package. The kiosk operating software would then access the information from the retail location satellite network 160 relating to the product in question then display product description information (as described below). Other similar or complimentary items, such as those that are associated by manufacturer or department (e.g. consumer audio, home appliance, etc.), could also be displayed as helpful suggestions to facilitate comparison shopping, and optionally to increase exposure of selected products currently being promoted by the retailer or the particular retail location. Understandably, such scanning of a product and the resulting navigation operations by the user would be tracked to compile advertising insight information as described below.

Alternatively or additionally, an RFID reader can be incorporated into the kiosks to identify RFID customer loyalty cards and RFID-tagged products in the vicinity. This configuration when used to identify RFID-tagged products would of course eliminate the need for the customer to physically scan the bar code of interesting products (in addition to automatically identifying participating consumers).

With regard to the information associated with each product (or "product information records"), each product item sold by the participating retailer preferably would have a unique information record that contains both product identification information and product descriptive information. As will be appreciated by those knowledgeable in the area of inventory management, commercial retailers generally track, such as in an accounting or inventory management system (such as inventory management sub-system 167 in FIG. 1), a variety of product identification information concerning each product item they stock, which typically includes the product name and product number, producer/manufacturer, SKU (i.e., "stock keeping unit" designation or UPC), price, and current discount or promotional information.

The product information, however, for each item in preferred embodiments of the present invention would preferably also contain information concerning each item in stock in addition to the typical information retained in contemporary inventory systems. This additional product information concerning each item is generally termed "product descriptive information" as it could include a variety of information types that may be of interest to consumers investigating that product item, such as listings of features, functions, warranties, available service plans, installation options, delivery options, and lists of related support products or accessories that are also for sale. This product descriptive information, like the identification information, could be searchable (such as by price range, producer/manufacturer, name, etc.) in the kiosk by the consumer or employees of the retailer and provide sufficient information for items carried by the retailer nationally, and/or in the particular retail location in which the kiosk is located. This information could thereby enable both novice and savvy consumers to learn about and make informed purchasing choices regarding particular product items available at that retail establishment in similar manner to how conventional e-commerce websites operate. Optionally, the kiosks could provide information concerning the stock of the retail establishment in items of interest (e.g., whether currently available, or when a shipment is expected if out of stock, and/or where to locate a given item on a shelf within the store). For example, a point-of-sale kiosk could access inventory management sub-system 167 to provide an indication to a user whether various products are currently in stock, expected restocking times for out of stock items, and the like.

Optionally, the kiosk could also include a credit card reader to enable customers, for example, to place direct ship orders for large items for which home delivery would be preferable, or to place direct ship orders or rain checks for items that are out of stock. Also optionally, certain ones of such kiosks could include an attached printing device that would enable printing of receipts, promotion details, order confirmations, shopping lists, and product information by customers.

Preferably, when a user of a kiosks requests information concerning certain products, he or she could be provided with multimedia information (such as videos showing the product in question, demonstrating its features or options, etc.) intended to instruct consumers regarding that item and/or similar products in the same category and/or by the same producer/manufacturer. This in turn would encourage consumers to purchase certain promoted products by providing a strong point-of-sale marketing effort to the benefit of the participating retailer, of producers and manufactures of products sold by the retailer, and both participating and non-participating customers. The multimedia information for various products of the retailer that are being promoted, in addition to being selectable by users of the kiosk, could be displayed by the kiosk as a screen saver to entice interaction by customers (and promote particular products to passing customers) during times when the kiosk is not in active use.

Optionally and additionally, each kiosk may allow participating consumers to interact with their personal accounts created with the converged marketing central network to track product items of interest, create (and optionally print) wish lists and shopping lists, and the like. In this regard, the personal account could then be re-accessed the next time the user visits a participating retail store having such a point-of-sale kiosk. The kiosk would thereby become an attraction for customers to become return customers of that particular retail location (or locations having the kiosks), and would increase demand for products being promoted by the kiosks and/or sold by the retailer.

The point-of-sale information sub-systems 166 thus are adapted to allow users to review the product information records to learn about products sold at the corresponding retail location and in turn identify desirable products that are being sold at that location. As the kiosks are used, however, they also automatically collect use information (search parameters used, which items' product information records are reviewed, which products are added to shopping lists, wish lists, reserved, etc.) and transfer that information regularly to the central network, where it is stored for later use. This use information may be periodically used to create market data and reports detailing, for example, emerging customer preferences, demographic trends, and the like which can be demographic-specific, retailer-specific, or of regional or larger scope.

Thus, the converged marketing architecture 100 constantly generates and compiles feedback information from the e-commerce web portal system 190, the PVR service 150, and various retail locations of the participating retailer via the retail location systems 170 (and its inventory management sub-system 167, sales sub-system 164, from RFID tracking sub-system 163, smart shopping cart sub-system 165, and point-of-sale information sub-system 166.

The converged marketing architecture 100 according to the present invention can understandably be used to differentiate and provide increased brand exposure for certain products or producers and manufacturers as desired. In this regard, the web portals 190 or kiosks of the point-of-sale information sub-systems 166 may be used to provide more detailed product description information, including in-depth reviews, multimedia presentations describing such products, promotional advertisements, and the like, that can be pushed to target the consumers when a producer/retailer decides to run a promotion. This more detailed product information can in turn be made viewable to consumers via the point-of-sale information systems, web portal, instant cell phone text, picture, or video messages, email, etc., as desired by certain product producer/manufacturers and or the participating retailer. Understandably, such differentiation can be employed independently of or in conjunction with any targeted advertisements generated in real time as described elsewhere herein.

As a history of consumer activity information records are compiled for participating consumers by the converged marketing architecture 100, it should be appreciated by one skilled in the art that this information can be used to create targeted advertisements to participating consumers as desired by retailers (and the producers/manufactures of the products the retailers sell). Website advertisements can be easily created, along with targeted mailings, multimedia email campaigns, and signage and "talking" advertisements for point-of-sale kiosks from the available information. These then can be delivered at times when it is believed that the advertisement would be the most effective in informing or persuading the target consumer.

For example, advertising space may be provided on the screens displayed by the kiosks or the e-commerce web portal for various products (or related third party services) to be advertised, similar in manner to banner advertisements on a website. For example, on pages showing high definition televisions, advertisements for newly released DVDs could be displayed to promote special targeted offers in this manner. These displays, as described further below, may be targeted to maximize advertising impact. Most preferably, the information collected in the consumer information database further may be utilized to tailor and drive product sales promotions at or near the point-of-sale, such as while a given consumer is shopping in a store location of a participating retailer.

One preferred mechanism for delivering targeted advertising at the point-of-sale includes the use of cellular telephone text messages (or messages of other suitable mobile instant messaging protocols) being delivered to a participating consumer after the consumer enters the store. In such preferred embodiments of the present invention, a participating consumer can be identified when they enter a retail location by their RFID-tagged consumer loyalty card. The retail location satellite network could then initiate a request for the converged marketing central network to generate a targeted advertisement to the consumer sent by instant message server 128 via a text messaging protocol (or other suitable wireless instant messaging protocol) to the particular participating consumer's cellular phone 183. The converged marketing central network would then review the demographic information and collected purchasing history information concerning the participating consumer and then, in conjunction with the pre-established promotional desires of the participating retailer as defined in the rules and configuration database 120*c*, craft a targeted and time specific promotional message to that participating consumer.

Web serving system 126 could be adapted to provide various remotely accessible front end web interfaces for enabling different groups of users to interact with and use the information collected by the converged marketing central network 110. Administrators 199 of the architecture 100 (including, for example, marketing program managers, select product manufacturers, and the like) could access a front end application operated by we server system 112 to review marketing and consumer information, such as by producing product preference trends and demographic reports.

It is preferred that this particular front end application to the converged marketing central network 110 be provided by the web serving system 112 to function as an advertiser interface that permits participating retailers (and optionally other advertisers) to query and access data relating to the performance of particular promotional campaigns, product type/item/class sales and browses (online or in-person), and track and report this information using statistical analyses and charts. Understandably, these track and reporting features can be focused using tools provided by the advertiser interface such that only data relating to a specific advertising media, promotional campaign, product type, manufacturer, demographic of consumer, etc., is used for a given report. Using these reporting features, participating retailers and other advertisers can adjust the incentives' discounts, durations, targeted demographics, etc., that characterize their various product promotions in essentially real time to drive consumer awareness and economic responses even after a promotional campaign has been underway for some time.

For example, a particular advertiser could review the data for a particular promotional campaign that offered 10% off the price of a big screen television purchase if purchased online and finds that a large portion of people have browsed the participating retailer's selection of big screen televisions online but have not made any purchases. This data may be interpreted by the advertiser as an indication that many consumers are interested in the discount, but that the discount maybe wasn't high enough to induce purchases, or that the time period should be extended. In real time, the advertiser could initiate additional discount offers to targeted consumers (e.g., participating consumers) while shipping in-store or while logged in online at the retailer's e-commerce web site to determine how to modify the larger promotion to the best effect.

Also, participating consumers 180 may be provided with a public web portal for reviewing or updating information concerning their loyalty program account via the Internet 195 (such as to, for example, update their instant messaging preferences). Understandably, such loyalty program web portal may be linked to or accessible from the web pages of the participating retailer's e-commerce website.

The architectures of the present invention, such as the one depicted in FIG. 1, enable methods for partially automating the aggregation and utilization of marketing information concerning various products offered by various retailers. Such methods according to embodiments in the invention include compiling a central consumer information database containing consumer demographic information and advertising insight information in the form of activity information records concerning various consumers and using them in conjunction with product information to research consumer preferences and target advertisements and promotions in light of those preferences.

Figure 2:
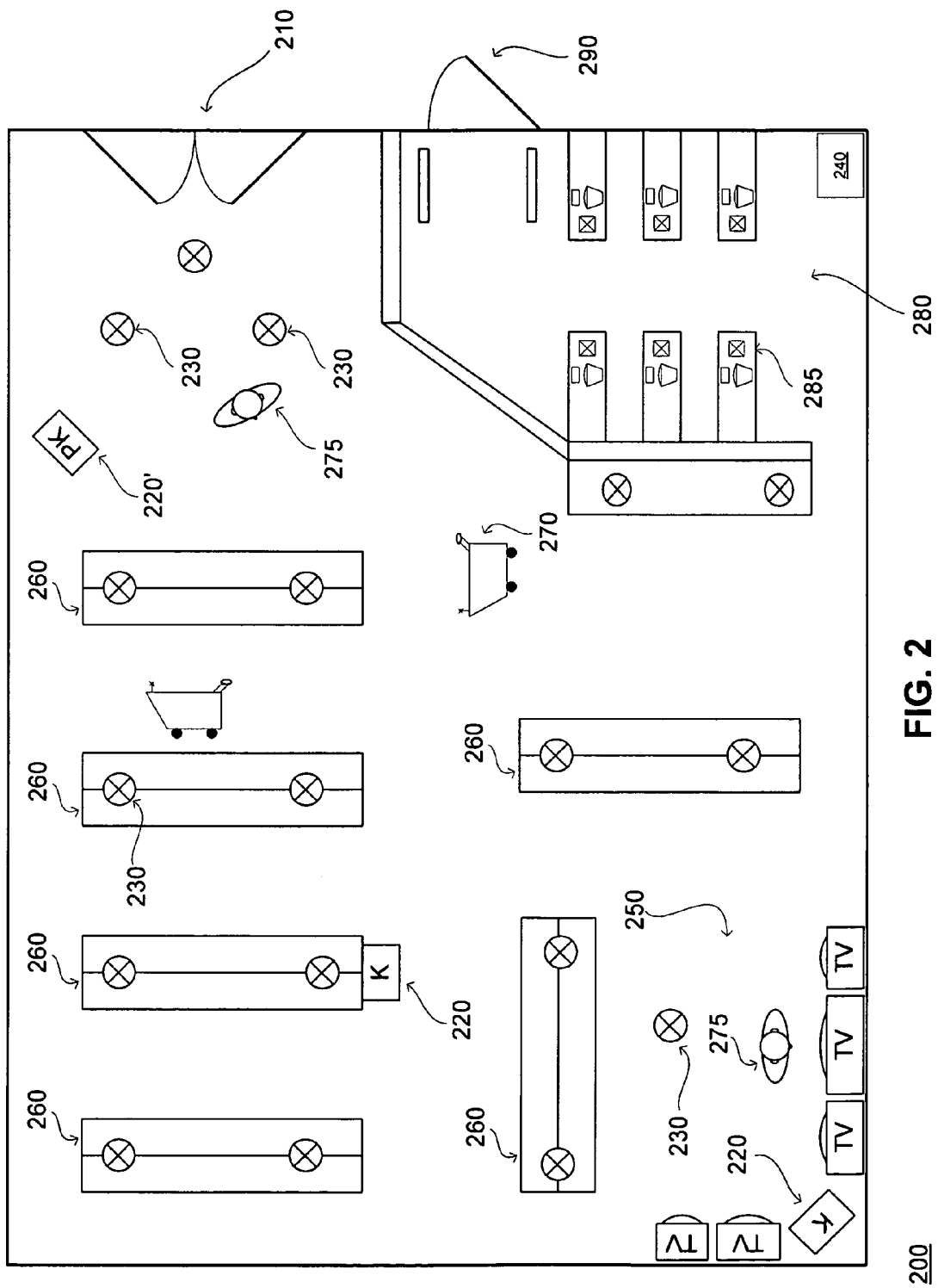
FIG. 2 is schematic diagram various elements of a retail location satellite network integrated within a physical retail store location of a retailer in accordance with certain embodiments of the present invention.

Depicted schematically in FIG. 2 is physical retail store layout plan 200 showing the various physical elements of a retail location satellite network integrated within a brick and mortar store of a participating retailer in accordance with certain embodiments of the present invention. As depicted in FIG. 2, store plan 200 shows a plurality of RFID reader sensors 230 located at various positions within the store, including a cluster of such sensors located near the entrance 210 of the store, as depicted. Such a cluster could be employed, for example, to provide a high probability that any given participating consumer 275 carrying an RFID-enabled customer loyalty card for the participating retailer will be detected and identified to the converged marketing central network soon after entering the store. This identifying enables immediate triggering of possible targeted marketing efforts to that participating consumer. The RFID sensors are in electronic communication (wired or wirelessly) with a retail location system control terminal 240 which serves as an interface mechanism with the remotely located converged marketing central network. For example, terminal 240 may comprise a networked personal computer that also serves the function of application server 161 depicted and described above with respect to FIG. 1, and terminal 240 is preferably connected to the Internet with a high speed connection to permit real time uploading and downloading of product information, sales information, and in-store customer activity information with the converged marketing central network.

As shown in plan 200, the store includes a variety of aisles and product display areas (such as television display area 250) formed by product shelves 260 for holding or displaying the items for sale. The RFID sensors preferably are physically distributed throughout plan 200 so as to maximize coverage area while also enabling terminal 240 to identify where in the store a particular participating consumer (carrying his or her RFID-enabled loyalty club card) browses and/or spends time during a given visit. Thus, for example, if a given participating consumer spends significant time in the television display area 250 of the store, this would be detected by certain RFID sensors and tracked by terminal 240, and then eventually transmitted by the retail location system to the converged marketing central network as advertising insight information Plan 200 also depicts the presence of various point-of-sale information system kiosks 220 located at various strategic positions throughout the store. According to certain preferred embodiments of the invention as depicted in FIG. 2, one or more promotional kiosks 220' can be located near the entrance 210 of the store. Promotional kiosks 220' can be similar in all respects to other kiosks with the exception that they may contain signage adapted to draw participating consumers 275 to use them immediately upon entering the store. By, for example, physically swiping their customer loyalty card at a promotional kiosk 200' a participating consumer could be given bonus loyalty points while also being asked by the kiosk 220' if he or she wishes to review the current promotions in the store, print off coupons, and the like. In this regard, promotional kiosk 200' encourages participating consumers 275 to remember to bring their RFID enabled loyalty cards when they visit the store, potentially increasing the effectiveness of the RFID tracking sub-system. As with RFID sensors 230, kiosks 220 and 220' are in electronic communication with terminal 240 such that they may be integrated into a unified retail location system.

FIG. 2 also depicts various smart shopping carts 270 in use in the store plan 200. Such carts, as described above, would be adapted for use by any customer within the store (not just participating consumers 270) and would include RFID sensing means for sensing when RFID-tagged boxes and other product items are placed within the basket of the cart 270 and communication means for wirelessly communicating with the terminal 240. Additionally, each smart shopping cart 270 is also fitted with an integrated mobile communication device that is wirelessly connected to the terminal 240 via the communication means and contains a display screen for communicating offers and other information (e.g., price of items in cart). Thus, when RFID-tagged products are placed within the cart 270, the terminal 240 can be continuously updated regarding the contents of a given cart 270. This in turn enables the customer to be sent to the display screen of their cart 270 instant in-store promotional offers from the converged marketing central network or the retail location system or other reminders (e.g., "Product X needs four AAA batteries!") in response to their in-store shopping activities.

Finally, check out area 280 near exit 290 of the store plan 200 includes various check out computers 285 as are conventional in the retail store industry, which may include receipt printers, bar code scanners, credit card scanners, cash drawers, and the like. Such check out computers 285 comprise part of the retail location system's sales information system, and are preferably networked with terminal 240 such that various types of sales information may also be uploaded on a regular basis to the converged marketing central network for tracking and analysis.

Figure 3:
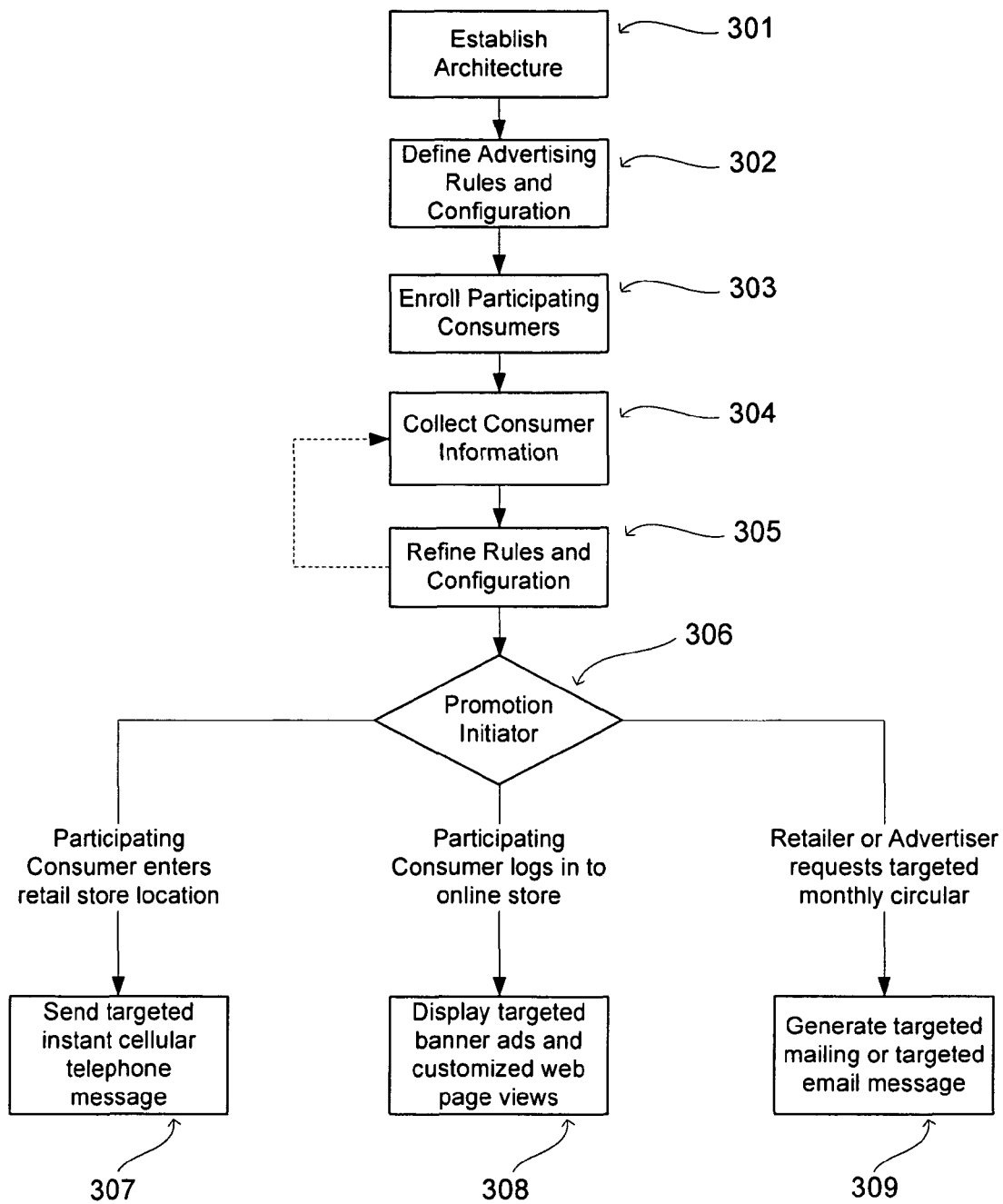
FIG. 3 is a flow diagram showing a targeted promotion process enabled by converged marketing architectures according to embodiments of the present invention to present promotions to in-store consumers.

Turning now to FIG. 3, there is depicted a flow diagram of a targeted promotion process 300 that presents promotions to in-store consumers by utilizing converged marketing architectures according to embodiments of the present invention. Targeted promotion process 300 as depicted is intended to assist one of ordinary skill in the art in understanding the interrelation of various steps in accordance with certain aspects of the present invention. It will be appreciated by those of ordinary skill in the art that unless otherwise indicated herein, the particular sequence of steps described is generally illustrative only and, where apparent, can be varied without departing from the spirit of the invention. Thus, the steps can be performed in any convenient or desirable order. Further, while not explicitly depicted, it will be understood by one skilled in the art that various ones of the steps below are meant to be repeated regularly in order to maintain current data.

As depicted in the flow diagram, process 200 can be thought of as having a set up phase consisting mainly of steps 301-303, an information gathering phase consisting mainly of steps 304-305, and a use or execution phase consisting mainly of steps 306-309. The set up phase comprises the various preparation steps taken to establish a working converged marketing architecture, and starts at step 301 with the establishing of the various components of the architecture. This would include the set up and networking of any computer networks, retail location systems and related information sub-systems and the like as described generally above. The set up phase at step 302 further includes defining advertising rules and configuration in a central rules and configuration database while at step 303 various customers of the participating retailer are enrolled into the customer loyalty program and thus identified in the consumer databases as participating consumers. This enrollment can be performed at retail store locations or via the participating retailer's e-commerce web portal, and each new participating consumer can be issued a loyalty program account and loyalty program card (preferably containing a unique RFID tag).

Once the architecture is set up, the participating retailer can begin to utilize the architecture by at step 304 collecting and compiling in the central consumer information databases consumer information from various sources (in-store, e-commerce web site, PVR services, etc.) regarding both participating consumer activities and generic consumer activities.

Participating retailers, product manufacturers, and other advertisers at any time after the first consumer information is received may then begin at step 305 to review this information and refine the promotional rules and configurations set within the central network to dictate what types of promotions or offers they would like to offer to certain types of consumers. As depicted by the dotted-line arrow in FIG. 3, it should be appreciated by one skilled in the art that steps 304 and 305 will essentially be occurring repeatedly and in parallel while the architecture continues in operation.

At some point in time during operation of process 300, various execution phases will be triggered by the occurrence of a promotion initiator 306 detected by various aspects of the architecture. For example, a promotion initiator can comprise a participating consumer entering a retail store location of the participating retailer and being detected due to his RFID-tagged loyalty program card. This could then cause process 300, after consulting and in accord with the rules and configuration database, to cause the converged marketing central network to send a targeted instant cellular telephone message at step 307 to provide that participating consumer with a customized instant promotion.

Similarly, as depicted the act of a participating consumer logging on to the participating retailer's web portal (such as by using a loyalty program web ID and password) could serve as a second type of initiator. In such circumstances, as depicted in FIG. 3 this could cause process 300 to display a targeted banner advertisement and/or customized web page views to the participating consumer at step 308 in accord with the wishes of the retailers/manufacturers/advertisers defined in the rules and configuration database.

Furthermore, a third type of initiator could include a retailer, manufacturer, or other advertiser requesting the compilation and sending of a targeted advertisement, such as a monthly circular. As depicted at step 309 of process 300, the detection of such an initiator by the architecture would cause the converged marketing central network to generate and send a targeted promotional mailing (conventional or email) to participating consumers.

While just three initiators are depicted in FIG. 3, it will be readily appreciated by one skilled in the art that various after reading the entirety of this document that other initiators could be used in the embodiments of the invention. Three such initiators are being shown explicitly only for sake of brevity and not to limit the scope of the present invention.

The following provides narrative examples of targeted marketing applications using the architecture of the present invention to integrate web, cell phone, and PVR device information for various participating consumers (i.e., "Consumer X," "Consumer Y," and "Consumer Z") in order to provide data retrieval and targeted marketing messages across a variety of modes.

Consumer X, the first participating consumer, had previously joined the consumer loyalty club program at his favorite home electronics chain and elected to subscribe to discounted PVR service associated with the loyalty program. As Consumer X watches his television at home on his PVR, he occasionally notices interactive commercials. One such commercial, for example, is for a popular digital camera brand and piques his interest. Consumer X rewinds this commercial several times as he had recently been shopping on-line for digital cameras at the retail store's web site and is interested in finding out more information.

Consumer X ordinarily likes to research products on-line to gather information and reviews and then use the in store shopping experience for hands-on examination of products in which he is interested. The commercial influences Consumer X to the point that the next day when he is off from work he visits the local retail store location of home electronics chain.

Since Consumer X is carrying his RFID-enabled customer loyalty card, as soon as he enters the store his cell phone rings alerting him of a pending video (or text) message. Upon reviewing the message, he is informed that he is being given a special offer (e.g., which may expire at the end of the day) addressed directly to him as a loyalty club member for a discount on digital cameras from that camera manufacturer.

Additionally, the cell phone message may also provide reminders and/or other offers to Consumer X regarding other items he might need, with those reminders/offers being linked to the camera offer (e.g., discounts on digital photo printers, or memory cards) or for previous purchases from the retailer. For example, if Consumer X had a few months prior bought a home office laser printer on-line from the retail chain, the message could also reminds him that he might need a new printer cartridge. Additionally, the message could provide him with helpful information that might make him more likely to buy the cartridge even if he does not currently need it, such as the model number and aisle location of the cartridge in the current retail store.

Additionally, the retail store location at which Consumer X is shopping may also be electronically enabled whereby it monitors (using RFID-enabled customer loyalty cards and/or smart shopping carts) shopping and browsing activity within different aisles or sections of the store. Thus, while shopping at the store for the digital camera, Consumer X may be found to have browsed for a significant time in the television section. The retail location's RFID monitoring system may communicate this information to the central consumer information database to update Consumer X's information such that the next time Consumer X logs into the online store he may be targeted with television set advertisements in addition to advertisements for accessories to his new digital camera.

As illustrated by this scenario, the cross-marketing benefits of the converged marketing architecture according to embodiments of the present invention are such that they provide a new 360-degree view of consumer. Advertising insight is provided into previous online purchase history, online browsing history, in store purchasing, in store browsing activity, and TV viewing habits (commercials skipped, commercials watched, etc.). The architecture enables the participating retailer and the producers/manufacturers whose products it sells to create customer segmented and targeted offerings based on consumer habits, preferences, and history. Furthermore, the participating consumer is happy to receive these advertisements as they give him access to special offers and promotions not available to the general public, and he doesn't see them as an intrusion because he has elected to participate in the various aspects of the loyalty program.

The following provides a second narrative example of for a second participating consumer, Consumer Y, that uses a location-aware and user-aware smart shopping cart that is able to identify products currently in the cart as well as potential additions or special offers for purchase.

Consumer Y, like Consumer X, also considers the participating retailer his favorite consumer electronics retail store and has been a member of the retailer's customer loyalty program for several months. One day while shopping at his local brick and mortar store for the retail chain, Consumer Y has put several items into his RFID-enabled smart shopping cart. His shopping cart contains a new DVD player, and a variety of DVD's and CD's. Consumer X's shopping cart notifies him that if he spends another $7 he can receive a free movie on demand from his cable company or receive 5 new MP3 songs from his favorite online digital music store which can instantly be downloaded to his mobile phone or deposited into his digital music library at home.

As shown in this scenario, the RFID-enabled shopping cart is able to update Consumer Y's shopping habits as tracked in the consumer information database in real-time. Based on its ability to track every such smart shopping cart through the store, and map purchases with traffic patterns, the smart shopping cart sub-system of the retail location enables the retailer and consumer electronics manufacturers to understand and affect consumer shopping behavior.

In the following third narrative example for a third participating consumer, Consumer Z, there is illustrated the use of point-of-sale information kiosks within a retail store location to provide targeted special offers for purchase. Consumer Z is also a member of the loyalty program. After shopping at the store for a while, Consumer Z decides to use kiosks to obtain information regarding various competing digital photo printers. The kiosk first presents Consumer Z, as a new user, with a view that allows the him either to log in to obtain customer loyalty program specials and/or points, or to perform a simple query for a product in the retailer's inventory by name or by product category. As Consumer Z is not intending to make any immediate printer purchase and, in any event, did not bring his loyalty card, he elects not to log in.

In the fashion known in computer application design, the screen uses a search engine that attempts to match and/narrow down search results as Consumer Z types in more and more letters for the name of a particular printer into a text box using a soft keyboard displayed on a touch screen video display monitor of the kiosk. Matching query hits are then displayed in a selection window until the Consumer Z sees a printer of interest and selects that printer product (such as by touching to highlight its name). From the search results page, the user can click on a view details button for the product of interest to thereafter be provided with a product details user view (i.e., access the product information records for the selected product).

Consumer Z is then presented by the kiosk with a product details screen that allows him to see product identification information and product descriptive information from the product information record for the particular printer. Additionally, a listing of similar products is also displayed, along with an indication of pricing for the selected product and similar products. Additionally, this kiosk display provides a button that enables Consumer Z to request directions regarding where he could find that particular product in the store. As one of the similar printer products is identified for promotion by the configuration rules established within the converged marketing central network, multi-media files touting the promotion and features of the printer being promoted is played in a small window.

This promotion interests Consumer Z, so he touches the window, which causes the kiosk to pull up a product details screen for that printer.

After reading up on the promoted printer, Consumer Z decides he will go see the printer in person on display in the store to gauge its size before deciding on the purchase.

Additionally, Consumer Z has in his basket a digital camera memory card, and scans its UPC label with a bar scanning device attached to the kiosk. He is given a detailed description user view of the memory card product, confirming that it is indeed the product he saw in the sale paper with an advertised manufacturer mail-in rebate. He then walks away, ending his session with the kiosk.

After a few moments of not being used, the kiosk goes into a sleep mode and stores various interactions with Consumer Z locally. Kiosk use information is then sent to a local database of the retail location system detailing the "click-through" success of the printer video promotion and detailing that the same session involved a user researching digital camera memory cards. This information is later relayed to the consumer databases of the converged marketing central network as generic consumer data.

Figure 4:
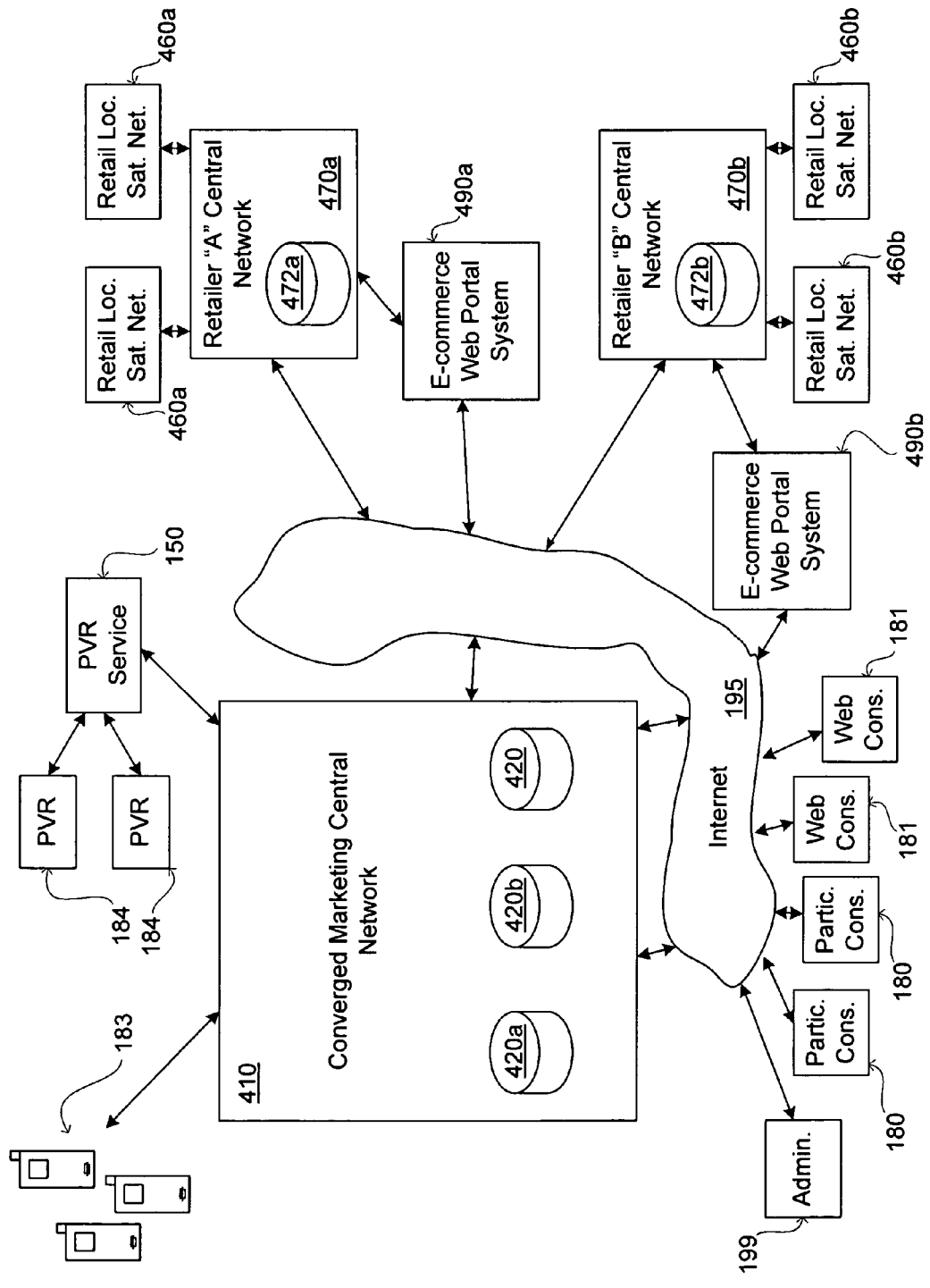
FIG. 4 is a schematic diagram showing an alternative converged marketing architecture according to an embodiment of the present invention that integrates the activities of multiple retailers.

FIG. 4 is a schematic diagram showing an alternative converged marketing architecture 400 according to an embodiment of the present invention that integrates the activities of multiple participating retailers. Where there are multiple participating retailers as depicted in FIG. 4, namely Retailer A and Retailer B in the example depicted, each retailer has their own retailer interface system that includes a respective retailer central network 470a and 470b, and one or more retail location satellite networks 460a and 460b associated with each network 470a and 470b. As shown in FIG. 4, the retailer central networks 470a and 470b serve as an interface with the converged marketing central network 410 (which may be substantially similar in function and design to network 110 as described above with respect to FIG. 1 except for the differences specifically noted herein) for each participating retailer that is cooperatively utilizing the same converged marketing architecture 400.

Similar in manner to the single participating retailer embodiment described above, it is preferable that each participating retailer establishes a retail location satellite network 460a and 460b for each of their brick and mortar retail store locations to enable the in store information gathering techniques described above. Such satellite networks could gather information from one or more of RFID tracking sub-systems, sales information and accounting sub-systems, smart shopping cart sub-systems, point-of-sale information sub-systems, and inventory management sub-systems in the manner as described above, and then transfer that information to their respective retailer central network 470a and 470b. Notably, each retailer central network 470a and 470b interface with their respective e-commerce web portal systems that support e-commerce web sites for each retailer and thus generate browsing and purchasing history information for traffic by generic web consumers 181 and participating consumers 180. This web history information is likewise collected by the retailer central networks 470a and 470b for transmission to the converged marketing central network 410.

The collected information may be stored locally by each retailer central network 470a and 470b in a database system 472a and 472b of the retailer central network (such as securely via the Internet 195 as depicted or via other suitable transmission mechanisms), but is then transferred to the converged marketing central network 410 for storage by its database system in one or more consumer information databases 420, 420a, and 420b. For example, converged marketing network 410 may (in addition to the various servers and databases as described above with respect to network 110 in FIG. 1) contain several parallel consumer information databases such that certain consumer information sent from retailer central network 470a may be stored separately in database 420a from certain consumer information sent from retailer central network 470b, which may be stored in database 420b. An additional consumer information database 420 may then be used to store consumer information that may be co-mingled from various participating retailers. Each such database may contain information regarding generic consumers collected from a variety of sources as well as information concerning specific participating consumers that are members of one or more consumer loyalty programs of the participating retailers.

As will be readily appreciated by one skilled in the art, the multiple participating retailer architecture 400 operates in similar fashion to the single participating retailer architecture 100 as described above. One notable difference is that architecture 400 contains a middle interface layer, retailer central networks 470a and 470b, between the converged marketing central network 410 and the various retail location satellite networks 460a and 460b that serves as one suitable way for different participating retailers to be able to segregate certain activities and information from one another while sharing resources and information such as, for example, PVR 184 usage information from PVR service 150, or sending targeted promotional messages to mobile devices 183 associated with participating consumers. It should be understood, however, that there are various alternative configurations of computing and networking elements for achieving this purpose that will be apparent to one skilled in the art.

Multiple participating retailers can establish joint loyalty programs that may be joined by consumers to share loyalty program benefits between these multiple retailers. In such embodiments of the present invention, the converged market central network 410 may be adapted to provide a public loyalty system web portal, such as a website, that is accessible through the Internet 195 and that optionally may be integrated with or accessible via links with the various e-commerce web portal systems 490a and 490b. Tasks that may be performed on this public loyalty program portal may include various administrative functions, such as enabling participating consumers to sign up to receive informational and/or promotional emails from selected retailers or producers/manufacturers, instant text messages via their cell phones, or regarding products having certain desired features (e.g., a certain size television being offered under a certain price). Additionally, for example, a participating consumer may view reviews and pricing information on products or review the status of the member rewards earned under the consumer loyalty program. This web portal could provide other useful information exclusively to the participating consumers, such as, for example, third party product reviews and ratings, marketing materials (such as demonstration videos), and links to one or more of the participating retailers' e-commerce web portals 490a and 490b to redeem promotions and discounts.

To increase traffic by participating consumers, this public loyalty program web portal could provide other interactive activities to draw consumers to the site including consumer education materials (for certain products) and interactive sites for those that register on the kiosk/web portal to use chat rooms, message boards and the like to share information about the products and review independent third party reviews of products. Understandably, while product review information and other like information not specific to participating retailers could be provided by this web portal for many products, such as all items for all participating retailers (or even products not offered by any participating retailer), the public loyalty program web portal would preferably be leveraged as a mechanism to market and promote items undergoing promotions through the converged marketing architecture. While accessing the various pages of the public loyalty program web portal, it should be appreciated that participating consumers may be targeted with notices of specials or promotions by participating retailers. It should also be appreciated that the types of data contained in the product information databases of each participating retailer would be equally of interest to end consumers from the home as well as from the point-of-sale. Thus, the public loyalty program portal according to the present invention may be further adapted to allow participating consumers to access information concerning various products offered by any one of the participating retailers and to generate consumer activity information.

In this manner, the product information services and technology provided by participating retailers reaches a wider audience, and the product producers/manufacturers associated with the converged marketing architecture obtain the ability to perform more valuable marketing to a wide audience of active product purchasers.

Various processes of the methods described herein may be implemented using software stored in the memory for execution by suitable processors. Alternatively, the mobile devices and/or servers may implement such processes and methods in hardware or a combination of software and hardware, including any number of processors independently executing various programs and dedicated hardware, such as application specific integrated circuits (ASICs), field programmable gate arrays (FPGAs), and the like.

Having described preferred embodiments of the invention, it will now become apparent to those of ordinary skill in the art that other embodiments incorporating these concepts may be used. Accordingly, it is submitted that that the invention should not be limited to the described embodiments but rather should be limited only by the spirit and scope of the appended claims.

Thus, although the invention has been described and illustrated with a certain degree of particularity, it is understood that the present disclosure has been made only by way of example, and that numerous changes in the combination and arrangement of steps or orientation of parts can be resorted to by those skilled in the art without departing from the spirit and scope of the invention, as will be claimed.

The invention claimed is:

1. A system, comprising:
one or more processors; and
one or more memory devices storing instructions that, when executed by the one or more processors, cause the one or more processors to:
  receive data for a personal video recording (PVR) service of an individually identifiable consumer;
  identify a commercial recorded by the PVR service that is rewound and re-watched at least once by the individually identifiable consumer;
  monitor, using radio frequency identification (RFID) sensors, movement of an RFID card, associated with the individually identifiable consumer, to detect in-store consumer activity of the individually identifiable consumer in a physical retail location during a first time;
  compile a consumer data structure comprising in-store consumer activity information and out-of-store consumer activity information for the individually identifiable consumer,
    the in-store consumer activity information indicating the in-store consumer activity, and
    the out-of-store consumer activity information indicating the commercial that is rewound and re-watched at least once;
  detect, in real time, an event at a second time after the first time, where the one or more processors, when detecting the event, are to at least one of:
    detect the RFID card, associated with the individually identifiable consumer, entering the physical retail location at the second time, or
    detect the individually identifiable consumer interacting with a web portal, associated with the physical retail location, at the second time; and
  deliver, in real time and after the event at the second time is detected, an instant electronic targeted advertisement for the individually identifiable consumer based on detecting the event at the second time and the consumer data structure,
    the instant electronic targeted advertisement including an advertisement for a product associated with the commercial based on the commercial being identified as being rewound and re-watched at least once by the individually identifiable consumer.

2. The system according to claim 1, where the RFID sensors are configured to identify the RFID card issued to the individually identifiable consumer as the RFID card moves throughout the physical retail location.

3. The system according to claim 1, where the one or more processors, when detecting the event, are to:
receive a communication that the individually identifiable consumer associated with the RFID card has begun shopping at the physical retail location.

4. The system according to claim 3, where the one or more processors, when delivering the instant electronic targeted advertisement, are to:
transmit the instant electronic targeted advertisement while the individually identifiable consumer is still shopping at the physical retail location.

5. The system according to claim 1, where the one or more processors, when delivering the instant electronic targeted advertisement, are to:
deliver the instant electronic targeted advertisement as a mobile instant message receivable on a device associated with the individually identifiable consumer.

6. The system according to claim 1, where the one or more processors, are further to
customize the instant electronic targeted advertisement based on advertising rules particular to the individually identifiable consumer.

7. The system according to claim 1, where the RFID sensors are further adapted to track browsing activity of the individually identifiable consumer by monitoring movements of the RFID card within the physical retail location.

8. The system according to claim 1, where the one or more processors are further to:
record browsing activity of the individually identifiable consumer within the physical retail location by monitoring movements of the RFID card within the physical retail location; and
transmit data concerning the browsing activity for storage as information concerning the individually identifiable consumer.

9. The system according to claim 8, wherein the data concerning the browsing activity includes information concerning what product areas, product displays, or both were viewed, visited, or both by the individually identifiable consumer.

10. The system according to claim 1, where the one or more processors are further to:
monitor the in-store consumer activity information from a point-of-sale information sub-system comprising one or more interactive electronic kiosks, the point-of-sale information sub-system being adapted to be usable by users within the physical retail location to access and review product data while shopping.

11. The system according to claim 10, where the one or more interactive electronic kiosks are adapted to provide at least one other targeted advertisement to users depending upon usage information collected during a given session on a given kiosk.

12. The system according to claim 11, where the at least one other targeted advertisement comprises a promotional message concerning a particular product offering relevant to certain product data accessed by a given kiosk during the given session.

13. The system according to claim 11, where the one or more interactive electronic kiosks permit users to log in as members of a customer loyalty program to identify themselves, and the at least one other targeted advertisement is customized based upon advertising rules and upon consumer activity information particular to past history of a given identified user.

14. The system according to claim 1, where the one or more processors are further to:
collect information from a smart shopping cart sub-system comprising one or more shopping carts, the one or more shopping carts each containing an integrated mobile communication device, and one or more RFID sensors for identifying products placed within a shopping cart of the one or more shopping carts,
said one or more shopping carts being made available to customers for shopping in the physical retail location and the one or more shopping carts being adapted to communicate identities of products placed in the one or more shopping carts.

15. The system according to claim 14, wherein the identities of the products are communicated for storage by the system.

16. The system according to claim 15, where the one or more processors are further to:
analyze the identities of the products and instruct the smart shopping cart sub-system to communicate a different instant electronic targeted advertisement to the customers via the integrated mobile communication device,
the different instant electronic targeted advertisement being determined according to the identities of the products.

17. The system according to claim 1, where the one or more processors are further to:
obtain information relating to out-of-store activities of consumers from an e-commerce web portal system adapted to capture web browsing information and web purchasing information from users, and
generate content of the instant electronic targeted advertisement based on the web browsing information and the web purchasing information.

18. The system according to claim 17, where the e-commerce web portal system is adapted to communicate other targeted advertisement messages to the users depending upon collected web browsing information and web purchasing information.

19. The system according to claim 1, where the PVR service collects personal video recording information.

20. The system according to claim 1 where the one or more processors are further to:
collect in-store consumer activity information further from a sales information system adapted to track product sales information for the physical retail location.

21. The system according to claim 1, the memory devices further storing instructions that, when executed by the one or more processors, cause the one or more processors to:
provide a front end interface enabling users to define rules for generating the instant electronic targeted advertisement.

22. The system according to claim 1, wherein the one or more processors are further to:
track at least one product selected by the individually identifiable consumer; and
generate the instant electronic targeted advertisement based on a value of the at least one selected product.

23. The system according to claim 22, where the one or more processors are further to:
track each product selected by the individually identifiable consumer,
the instant electronic targeted advertisement being generated based on a total value of products selected by the individually identifiable consumer.

24. The system according to claim 1, further comprising: the RFID sensors.

25. A method, comprising:
receiving, by at least one device, data for a personal video recording (PVR) service of an individually identifiable consumer;
identifying, by the least one device, a commercial recorded by the PVR service that rewound and re-watched at least once by the individually identifiable consumer;
monitoring, by the at least one device and using radio frequency identification (RFID) sensors, movement of an RFID card, associated with the individually identifiable consumer to detect in-store consumer activity of the individually identifiable consumer in a physical retail location during a first time;
compiling, by the at least one device, a consumer data structure comprising in-store consumer activity information and out-of-store consumer activity information for the individually identifiable consumer,
the in-store consumer activity information indicating the in-store consumer activity, and
the out-of-store consumer activity information indicating the commercial that is rewound and re-watched at least once;
detecting, by the at least one device and in real time, the individually identifiable consumer entering the physical retail location by detecting the RFID card entering the physical retail location at a second time after the first time; and
delivering, by the at least one device and in real time, an instant electronic targeted advertisement for the individually identifiable consumer based on detecting the individually identifiable consumer entering the physical retail location at the second time and based on the consumer data structure,
the instant electronic targeted advertisement including an advertisement for a product associated with the commercial based on the commercial being identified as being rewound and re-watched at least once by the individually identifiable consumer.

26. The method according to claim 25, where the instant electronic targeted advertisement comprises a promotion message sent to the individually identifiable consumer via a cellular telephone instant messaging protocol.

27. The method according to claim 25, where the instant electronic targeted advertisement comprises a promotion message displayed on a web site page.

28. The method according to claim 25, further comprising:
receiving a request to generate a targeted circular, and
generating multiple different targeted promotions for different consumers enrolled in a customer loyalty program in response to the request.

29. The method according to claim 23, further comprising:
enrolling the individually identifiable consumer, by issuing a loyalty program account and loyalty program card to the individually identifiable consumer.

30. A method, comprising:
receiving, by at least one device, data for a personal video recording (PVR) service of an individually identifiable consumer;
identifying, by the least one device and based on monitoring the data, a commercial recorded by the PVR service that rewound and re-watched at least once by the individually identifiable consumer;
monitoring, by the at least one device and using radio frequency identification (RFID) sensors, movement of an RFID card, associated with the individually identifiable consumer, to detect in-store consumer activity of the individually identifiable consumer in a physical retail location using radio frequency identification (RFID) sensors,
at least one of the RFID sensors being associated with an in-store product display within the physical retail location;
compiling, by the at least one device, a consumer data structure comprising in-store consumer activity information and out-of-store consumer activity information for the individually identifiable consumer,
the in-store consumer activity information indicating the in-store consumer activity, and
the out-of-store consumer activity information indicating the commercial that is rewound and re-watched at least once;
detecting, by the at least one device and in real time, the individually identifiable consumer interacting with a web portal associated with the physical retail location; and
transmitting, by the at least one device and in real time, an instant electronic targeted advertisement for the individually identifiable consumer based on detecting the individually identifiable consumer interacting with the web portal and based on the consumer data structure,
the instant electronic targeted advertisement including an advertisement for a product associated with the commercial based on the commercial being identified as being rewound and re-watched at least once by the individually identifiable consumer.

31. The method of claim 30, where monitoring the data for the PVR service includes:
detecting that a recording device is used to repeatedly rewind and re-watch the commercial.

32. The method of claim 30, where monitoring the data for the PVR service includes:
detecting that a recording device is used to skip another commercial.

33. The method of claim 30,
where the transmitting includes transmitting the instant electronic targeted advertisement to the individually identifiable consumer at a time that the individually identifiable consumer is detected entering the physical retail location for a visit subsequent to when the in-store consumer activity of the individually identifiable consumer was monitored.

* * * * *